United States Patent
Kim

Patent Number: 6,014,434
Date of Patent: Jan. 11, 2000

[54] METHOD FOR CONTROLLING AND PROCESSING AN INCOMING CALL OF A LINE-BUSY EXCHANGE SYSTEM

[75] Inventor: Hong-Han Kim, Gumi, Rep. of Korea

[73] Assignee: SamSung Electronics Co., Ltd., Kyungki-do, Rep. of Korea

[21] Appl. No.: 08/884,487

[22] Filed: Jun. 27, 1997

[30] Foreign Application Priority Data

Jun. 27, 1996 [KR] Rep. of Korea ..................... 96/24443

[51] Int. Cl.$^7$ ................................................. H04M 1/00
[52] U.S. Cl. .................. 379/157; 379/93.17; 379/93.35; 379/164; 379/215; 379/142
[58] Field of Search ............................ 379/93.17, 93.35, 379/164, 208, 215, 376, 157, 265, 266, 142, 373

[56] References Cited

U.S. PATENT DOCUMENTS

| | | | |
|---|---|---|---|
| 4,277,649 | 7/1981 | Sheinbein | 379/201 |
| 4,873,719 | 10/1989 | Reese | 379/215 |
| 4,942,601 | 7/1990 | Park | 379/209 |
| 4,947,421 | 8/1990 | Toy et al. | 379/67.1 |
| 4,975,944 | 12/1990 | Cho | 379/209 |
| 4,991,203 | 2/1991 | Kakizawa | 379/209 |
| 5,206,904 | 4/1993 | Koma | 379/354 |
| 5,263,084 | 11/1993 | Chaput et al. | 379/215 |
| 5,363,429 | 11/1994 | Fujisawa | 455/415 |
| 5,425,077 | 6/1995 | Tsoi | 455/566 |
| 5,481,595 | 1/1996 | Ohashi et al. | 379/88.27 |
| 5,528,235 | 6/1996 | Lin et al. | 341/22 |
| 5,544,235 | 8/1996 | Ardon | 379/177 |
| 5,619,561 | 4/1997 | Reese | 379/142 |
| 5,621,790 | 4/1997 | Grossman et al. | 379/266 |
| 5,636,269 | 6/1997 | Eisdorfer | 379/215 |
| 5,784,448 | 7/1998 | Yaker | 379/215 |
| 5,790,652 | 8/1998 | Gulley et al. | 379/368 |
| 5,799,074 | 8/1998 | Man et al. | 379/93.35 |
| 5,805,677 | 9/1998 | Ferry et al. | 379/93.35 |
| 5,815,566 | 9/1998 | Ramot et al. | 379/265 |
| 5,825,867 | 10/1998 | Epler et al. | 379/215 |
| 5,857,017 | 1/1999 | Ohi et al. | 379/157 |
| 5,937,046 | 8/1999 | Lee | 379/156 |

*Primary Examiner*—Scott Wolinsky
*Assistant Examiner*—Roland G. Foster
*Attorney, Agent, or Firm*—Robert E. Bushnell, Esq.

[57] ABSTRACT

A method for controlling and processing a call from one keyphone to a busy keyphone utilizing a keyphone main unit connected to an office line and a plurality of keyphones in a keyphone system, the busy keyphone being connected to a third keyphone, wherein the keyphone main unit receives an input sequence of dialed numbers from the one keyphone; determines when the input sequence is complete; transmits a first display signal to the busy keyphone to cause the busy keyphone to display a message indicating an incoming call from the one keyphone; determines whether the busy keyphone is in a forced off-hook ring mode; transmits a busy tone to the one keyphone when it is determined that the busy keyphone is not in the forced off-hook ring mode; checks for an input signal from an off-hook ring button on the one keyphone; transmits an off-hook ring signal to the busy keyphone when it is determined that the busy keyphone is in the forced off-hook ring mode or when it is determined that the off-hook ring button on the one keyphone was pushed, the off-hook ring signal causing the busy keyphone to perform an off-hook ring; transmitting a ring back tone and a camp-on-busy signal to the one keyphone; checks for an input signal indicative of an on/off activation of a switch hook or a CALL button on the busy keyphone; and stops the off-hook ring of the busy keyphone and connecting a speech path between the one keyphone and the busy keyphone when on/off activation of the switch hook or pushing of the CALL button on the busy keyphone is detected.

13 Claims, 8 Drawing Sheets

METHOD FOR CONTROLLING AND PROCESSING AN INCOMING CALL OF A LINE-BUSY EXCHANGE SYSTEM

CLAIM OF PRIORITY

This application makes reference to, incorporates the same herein, and claims all benefits accruing under 35 U.S.C. §119 from an application entitled Method For Controlling And Processing Incoming Call Of Line-Busy Exchange System earlier filed in the Korean Industrial Property Office on Jun. 27, 1996, and there duly assigned Ser. No. 24443/1996 by that Office.

BACKGROUND OF THE INVENTION

1. Field of the Invention

The present invention relates to an exchange system, and in particular, a method for controlling and processing an incoming call of a line-busy keyphone system.

2. Description of the Related Art

Generally, private exchange systems, such as keyphone systems, have an off-hook ring service function for ringing a busy tone to a keyphone, in the case that a calling part of an extension station wants to call a calling part of the keyphone during call between another calling part of the extension station and the calling part of the keyphone. The aforesaid function therefor is conventionally to ring an off-hook ring to only a line-busy keyphone. As a result, even though the user, who is calling, can know the fact that the call is made, he can not know the counterpart's telephone number to be called. For example, when a director calls out his secretary or an emergency call is made from the director in the place such as a company, the user should hold on or ring off a current call in order to speak to him over a ringing call. Accordingly, there has been a problem in which because he can not check which call is important between the current call and the ringing call, he can not provide a proper service due to answering the ringing call late.

U.S. Pat. No. 4,991,203 to Katsuhiro Kakizawa entitled Line Switching Apparatus And Method describes a known method of placing a calling extension in a camp-on-busy state when a called extension is determined to be busy.

SUMMARY OF THE INVENTION

It is therefore an object of the present invention to provide a method for controlling and processing an incoming call of a line-busy exchange system capable of solving problems of a prior art.

It is another object of the present invention to provide a method for controlling and processing an incoming call of a line-busy private exchange system capable of improving service for answering an incoming call.

To achieve the above objects, there is provided with a method for controlling and processing an incoming call of a line-busy private exchange system, having a private exchange main unit connected to an office line and a plurality of keyphones, the method utilizing the steps of checking whether or not another incoming call for forming a speech path with a line-busy keyphone is generated, when a certain keyphone of the plurality of keyphones is in a line-busy state, reading a telephone number of a calling part, thereby displaying the read telephone number on a display of the line-busy keyphone, when the another incoming call is generated, and placing the busy line on hold and forming a speech path for the another incoming call, in response to a specific signal received from the line-busy keyphone.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Now, a preferred embodiment of the present invention will be described in detail with reference to the accompanying drawings.

In the following description, numerous specific details such as components and frequencies of the concrete circuit, are set forth to provide a more thorough understanding of the present invention. It will be apparent, however, to one skilled in the art that the present invention may be practiced without these specific details. The detailed description of known function and constructions unnecessarily obscuring the subject matter of the present invention will be avoided in the present invention.

Figure 1:
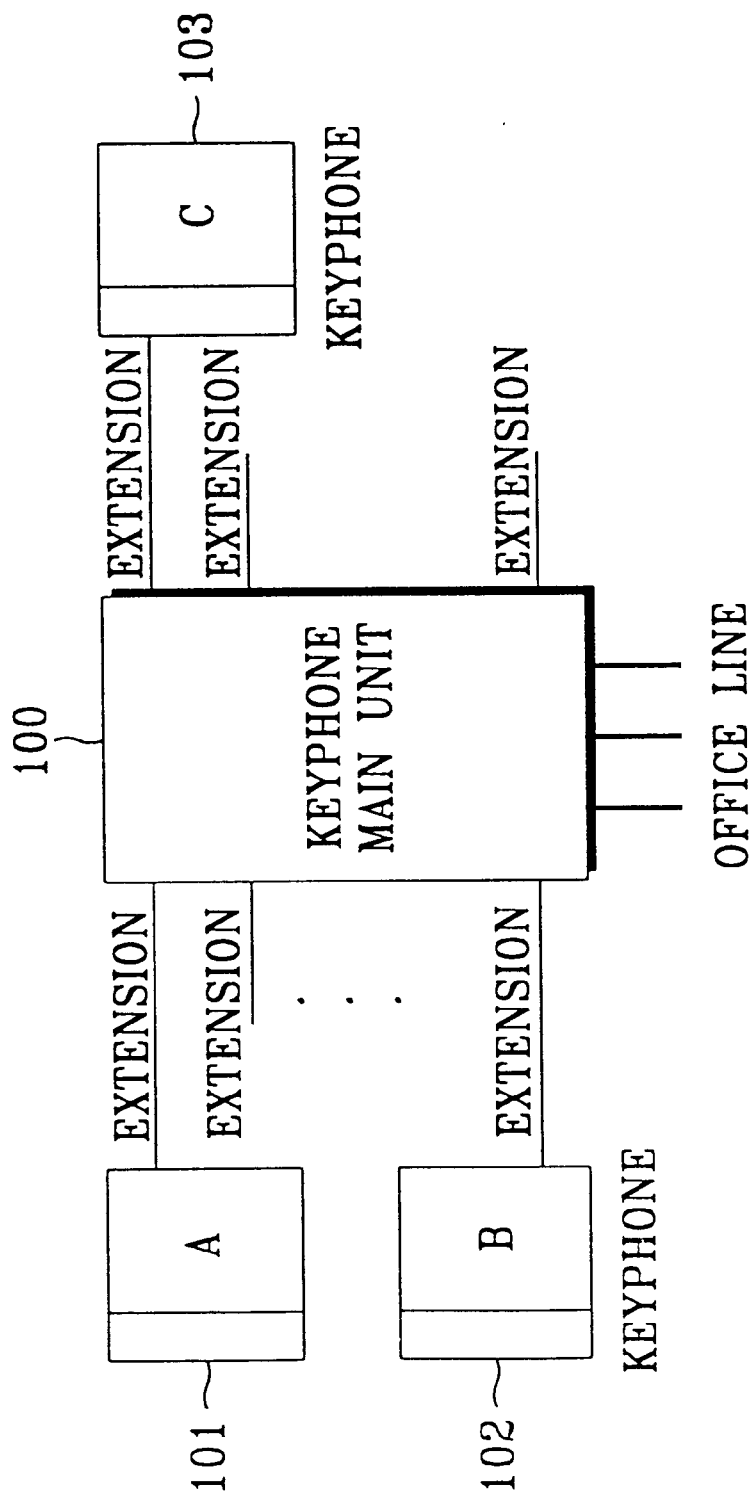
FIG. 1 is a block diagram showing hardware of a keyphone system applicable to the present invention.

FIG. 1 is a block diagram showing the hardware of the keyphone system applicable to the present invention showing the a keyphone main unit 100 connected between an office line and keyphones 101–103. The keyphone main unit 100 controls overall operations of the keyphone system according to a previously set program, connects a call inputted to an office line to a corresponding keyphone of the above keyphones and then, performs corresponding services in response to a plurality of signals provided from the keyphone.

Figure 2:
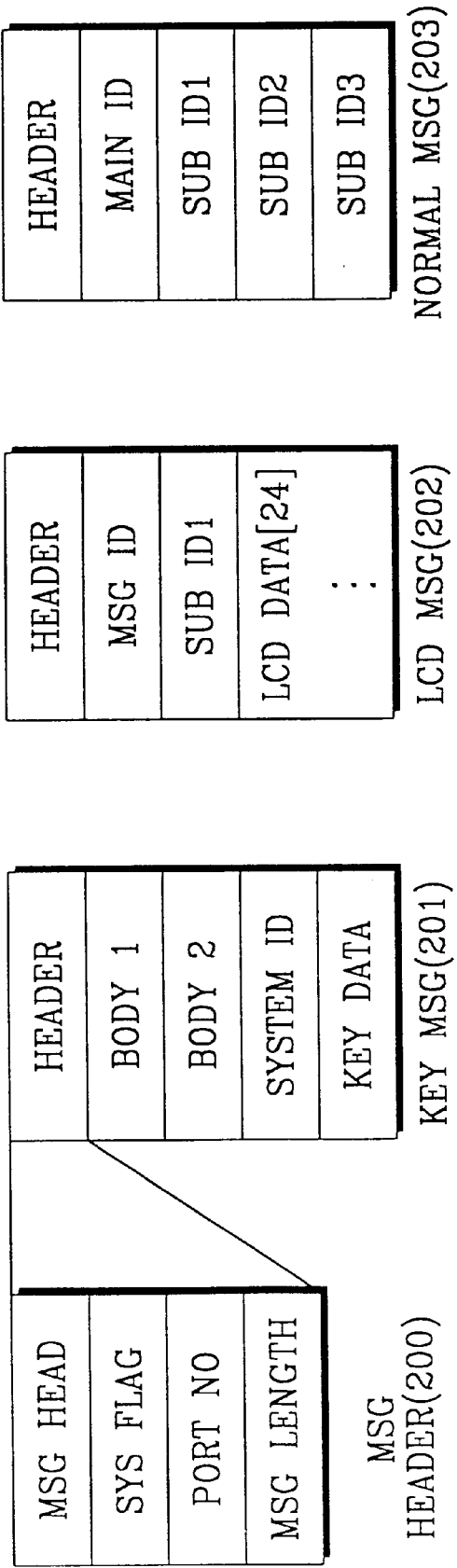
FIGS. 2A, 2B, 2C and 2D are views showing the formats of the messages transmitted and received between a keyphone main unit and extension keyphones.

FIGS. 2A, 2B, 2C and 2D are views showing formats of messages transmitted and received between a keyphone main unit 100 and keyphones 101–103. FIG. 2A shows the construction of a message header, including a domain for a message head, a domain for a system flag, a domain for a port number, and a domain for a message length. FIG. 2B shows the construction of a key message. FIG. 2C shows the construction of a LCD message. And FIG. 2D shows the construction of a normal message.

Figure 3:
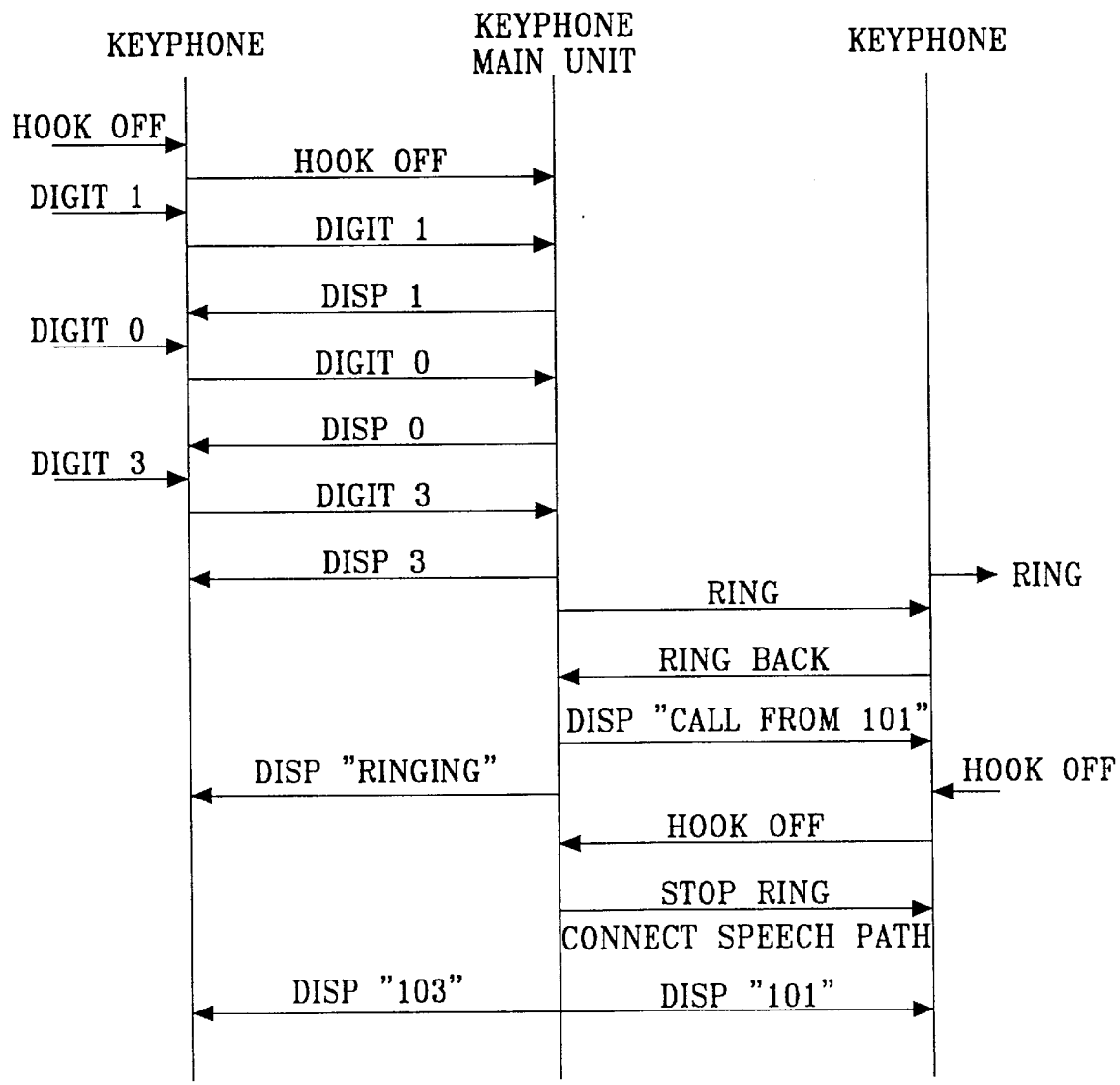
FIG. 3 is a view showing an exemplary flow chart of a normal call.

FIG. 3 is a view showing a flow chart for processing a normal call from one keyphone, i.e., keyphone 101, to another keyphone, i.e., keyphone 103 of the keyphone system shown in FIG. 1 When keyphone 101 is taken off-hook an off-hook signal is transmitted to keyphone main unit 100. Then the user operates the keys of keyphone 101 to call keyphone 103 by dialing "103". As each number is dialed it is transmitted to keyphone main unit 100 and main keyphone unit sends back a display signal causing keyphone 101 to display each number dialed. Upon completion of a dialed number, keyphone main unit 100 sends a ring signal to the dialed keyphone, i.e., keyphone 103. Keyphone 103 receives the ring signal and transmits a known ring back signal to keyphone main unit 100. Upon receipt of the ring back signal, keyphone main unit 100 transmits a display signal to cause keyphone 103 to display a message identifying the calling keyphone, i.e., keyphone 101 while simultaneously transmitting a display signal to keyphone 101 for displaying a message indicating that the called keyphone is ringing. When keyphone 103 is taken off-hook in order to answer the incoming call, an off-hook signal is transmitted to keyphone main unit 100. Keyphone main unit 100 detects the off-hook signal from keyphone 103 and stops the transmission of the ring signal to halt the ringing of keyphone 103, and establishes a speech path between keyphone 101 and keyphone 103. Main keyphone then transmits a display message to keyphone 100 to display the number of the called keyphone while simultaneously transmitting a display message to keyphone 103 to display the number of the calling keyphone.

The speech path between keyphone 101 and keyphone 103 having been established, as discussed with respect to FIG. 3, then both keyphones 101 and 103 are in a busy state. A call placed to, for example, keyphone 103, from one of the other keyphones connected to keyphone main unit 100, i.e., keyphone 102, will now be discussed with respect to FIG. 4. When keyphones 101 and 103 are in communication with each other, the number "103" is displayed on a display of keyphone 101 while the number "101" is displayed on the display of keyphone 103. At this time, when keyphone 102 is taken off-hook an off-hook signal is transmitted to keyphone main unit 100. Then the user operates the keys of keyphone 102 to call keyphone 103 by dialing "103". As each number is dialed it is transmitted to keyphone main unit 100 and main keyphone unit sends back a display signal causing keyphone 102 to display each number dialed. Upon completion of a dialed number, keyphone main unit 100 sends a busy tone back to keyphone 102.

Here, it is noted that each keyphone includes an off-hook ring (OHR) button and may include a CALL button. When the user of keyphone 102 pushes the OHR button thereby forcing keyphone 102 into an off-hook ring service mode, keyphone main unit 100 detects a OHR signal and transmits an off-hook ring signal to keyphone 103 causing keyphone 103 to ring, the ring being an off-hook ring signal such as a busy tone or call waiting tone, to inform the user of keyphone 103 that another incoming call is being attempted. Otherwise, when the OHR button is not pushed, keyphone main unit 100 transmits a ring back signal to keyphone 102 and only a ring back tone is rung in the keyphone 102, and a camp-on-busy message, i.e., "CAMP ON TO 103", is displayed on a liquid crystal display (LCD) of keyphone 102. Also, keyphone 103 continues to display the number "101".

When a hook on/off operation is repeatedly performed in the keyphone 103 by pushing and releasing the hook switch, or a flashing CALL button is pushed during the off-hook ring service mode, a corresponding signal is transmitted from keyphone 103 to keyphone main unit 100. Then the call between keyphones 101 and 103 is cut off, main keyphone unit stops the off hook ring and connects a speech path between keyphone 102 and 103 so that the users of keyphones 102 and 103 can communicate. At his time the number of "103" is displayed on the LCD of keyphone 102 while the number "102" is displayed on the LCD of keyphone 103. Here, it is noted that although the call for the incoming call is achieved, the off-hook ring service function is possible to provide the off-hook ring only to the line-busy keyphone. As a result, the user of keyphone 103 is not aware of who is calling and thus does not know if the call is important. Accordingly, the user of keyphone 103 must decide whether or not to answer the incoming call and thus may miss an important call, or may disconnect a current call to answer an unimportant incoming call.

Figure 4:
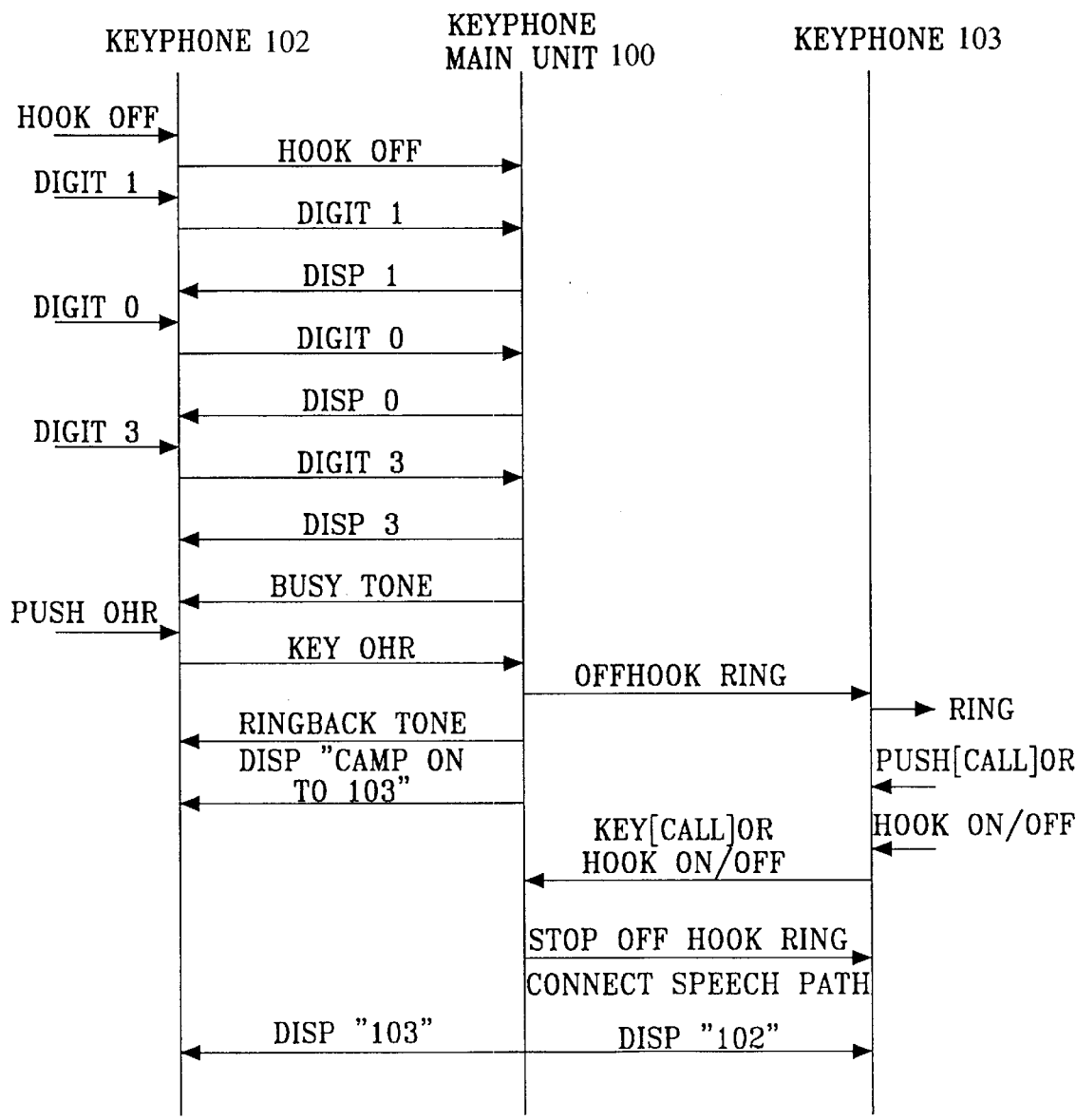
FIG. 4 is a view showing an exemplary flow chart for controlling and processing an incoming call of a line-busy keyphone.

In order to avoid the problem associated with the method outlined with respect to FIG. 4, a method for controlling and processing a call to a busy keyphone according to the principles of the present invention will now be described with respect to FIGS. 5–7.

The speech path between keyphone 101 and keyphone 103 having been established, as discussed with respect to FIG. 3, then both keyphones 101 and 103 are in a busy state. A call placed to, for example, keyphone 103, from one of the other keyphones connected to keyphone main unit 100, i.e., keyphone 102, will now be discussed with respect to FIG. 5. When keyphones 101 and 103 are in communication with each other, the number "103" is displayed on a display of keyphone 101 while the number "101" is displayed on the display of keyphone 103. At this time, when keyphone 102 is taken off-hook an off-hook signal is transmitted to keyphone main unit 100. Then the user operates the keys of keyphone 102 to call keyphone 103 by dialing "103". As each number is dialed it is transmitted to keyphone main unit 100 and main keyphone unit sends back a display signal causing keyphone 102 to display each number dialed. Upon completion of a dialed number, keyphone main unit 100 sends a display signal to the called keyphone, i.e., keyphone 103, causing keyphone 103 to display a message indicating that a call from keyphone 102 is being attempted, and sends a busy tone back to keyphone 102.

Here, when the user of keyphone 102 pushes the OHR button thereby forcing keyphone 102 into an off-hook ring service mode, keyphone main unit 100 detects the OHR signal and transmits an off-hook ring signal to keyphone 103 causing keyphone 103 to ring, the ring being an off-hook ring signal such as a busy tone or call waiting tone. Otherwise, when the OHR button is not pushed, keyphone main unit 100 transmits a ring back signal to keyphone 102 and only a ring back tone is rung in the keyphone 102, and a camp-on-busy message, i.e., "CAMP ON TO 103", is displayed on a liquid crystal display (LCD) of keyphone 102.

Since the number of the keyphone attempting a call is displayed on keyphone 103, then the user of keyphone 103 will be informed as to who is calling and can then determine whether the call may be important or not. When a hook on/off operation is repeatedly performed in the keyphone 103 by pushing and releasing the hook switch, or a flashing CALL button is pushed during the off-hook ring service mode, a corresponding signal is transmitted from keyphone 103 to keyphone main unit 100. Then the call between keyphones 101 and 103 is cut off, main keyphone unit stops the off hook ring and connects a speech path between keyphone 102 and 103 so that the users of keyphones 102 and 103 can communicate. At his time the number of "103" is displayed on the LCD of keyphone 102 while the number "102" is displayed on the LCD of keyphone 103. However, when the hook on/off operation is not repeatedly performed or the twinkling [CALL] button thereof is not pushed within a predetermined time period, the call between keyphones 101 and 103 is constantly maintained and the display of keyphone 103 again displays the number "101". If the call from keyphone 101 is place in a hold state when the user of keyphone 103 presses the hook switch on/off or presses the CALL button, the held call can be continued after completing the call between keyphones 102 and 103.

Alternatively, when keyphone 103 is continuously in an off-hook ring mode, a method for controlling and processing a call to busy keyphone 103 according to the method shown in FIG. 6 will now be described. When keyphones 101 and 103 are in communication with each other, as discussed with respect to FIG. 3, the number "103" is displayed on a display of keyphone 101 while the number "101" is displayed on the display of keyphone 103. At this time, when keyphone 102 is taken off-hook an off-hook signal is transmitted to keyphone main unit 100. Then the user operates the keys of keyphone 102 to call keyphone 103 by dialing "103". As each number is dialed it is transmitted to keyphone main unit 100 and main keyphone unit sends back a display signal causing keyphone 102 to display each number dialed. Upon completion of a dialed number, keyphone main unit 100 sends a display signal to the called keyphone, i.e., keyphone 103, causing keyphone 103 to display a message indicating that a call from keyphone 102 is being attempted, transmits an off-hook ring signal to keyphone 103 causing keyphone 103 to ring, the ring being an off-hook ring signal such as a busy tone or call waiting tone, transmits a ring back signal to keyphone 102, and then transmits a camp-on-busy message, i.e., "CAMP ON TO 103", to keyphone 102, which message is then is displayed on the LCD of keyphone 102.

Since the number of the keyphone attempting a call is displayed on keyphone 103, then the user of keyphone 103 will be informed as to who is calling and can then determine whether the call may be important or not. When a hook on/off operation is repeatedly performed in the keyphone 103 by pushing and releasing the hook switch, or a flashing CALL button is pushed during the off-hook ring service mode, a corresponding signal is transmitted from keyphone 103 to keyphone main unit 100. Then the call between keyphones 101 and 103 is cut off, main keyphone unit stops the off hook ring and connects a speech path between keyphone 102 and 103 so that the users of keyphones 102 and 103 can communicate. At his time the number of "103" is displayed on the LCD of keyphone 102 while the number "102" is displayed on the LCD of keyphone 103. However, when the hook on/off operation is not repeatedly performed or the twinkling [CALL] button thereof is not pushed within a predetermined time period, the call between keyphones 101 and 103 is constantly maintained and the display of keyphone 103 again displays the number "101". If the call from keyphone 101 is place in a hold state when the user of keyphone 103 presses the hook switch on/off or presses the CALL button, the held call can be continued after completing the call between keyphones 102 and 103.

Figure 5:
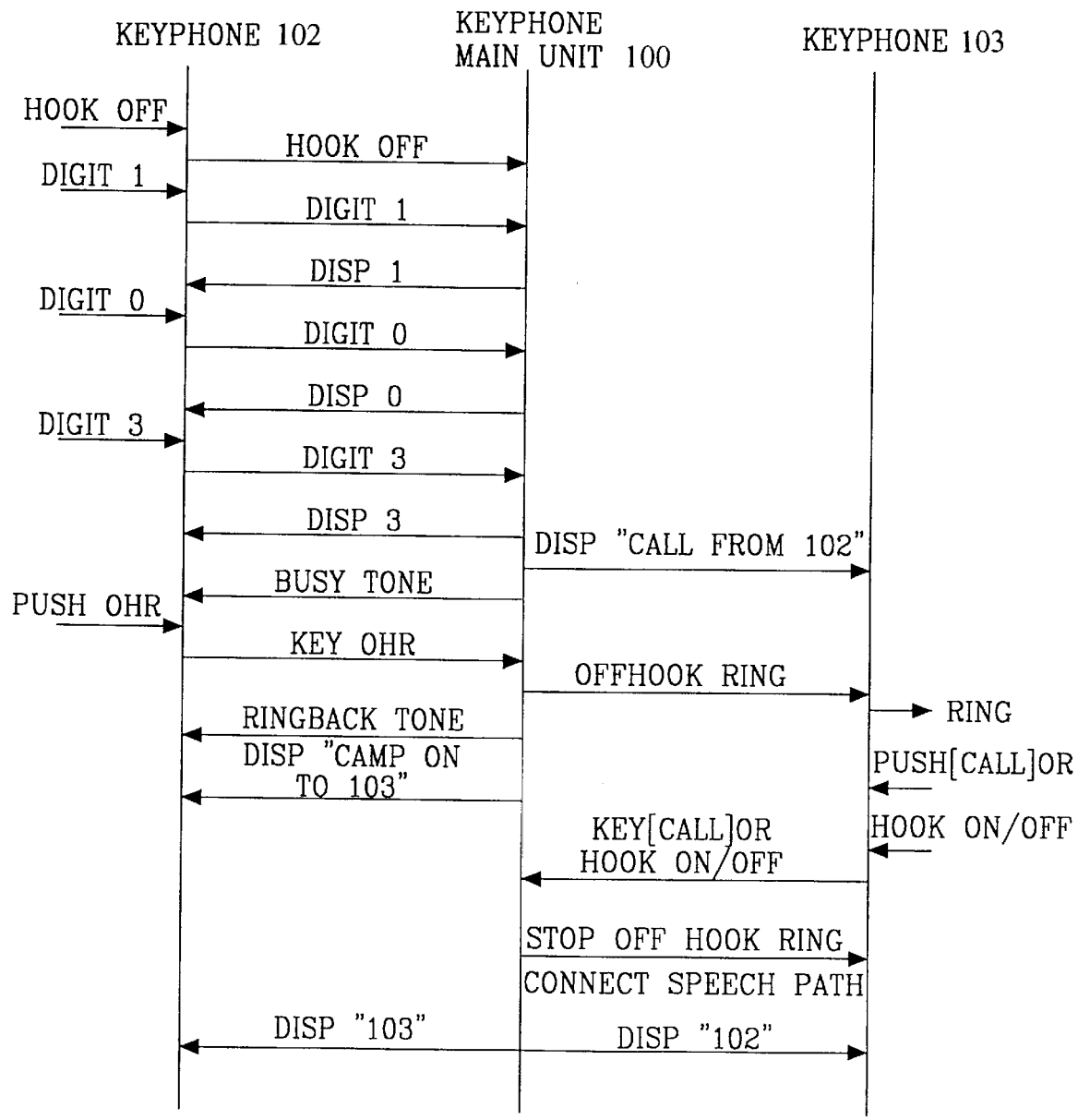
FIGS. 5 and 6 are flow charts showing embodiments for controlling and processing of an incoming call to a keyphone in a line-busy state according to the principles of the present invention.
Figure 6:
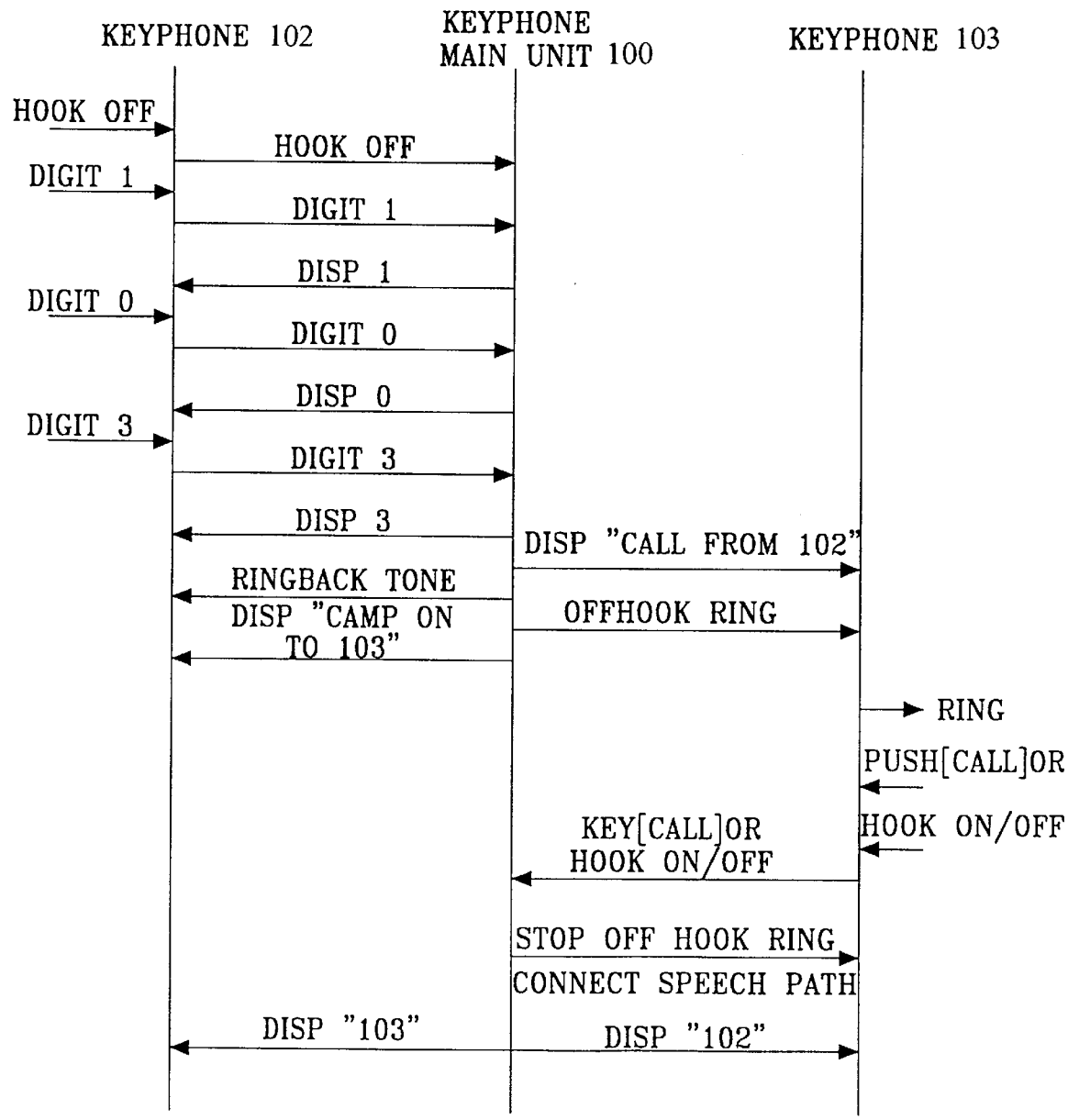
Figure 7A:
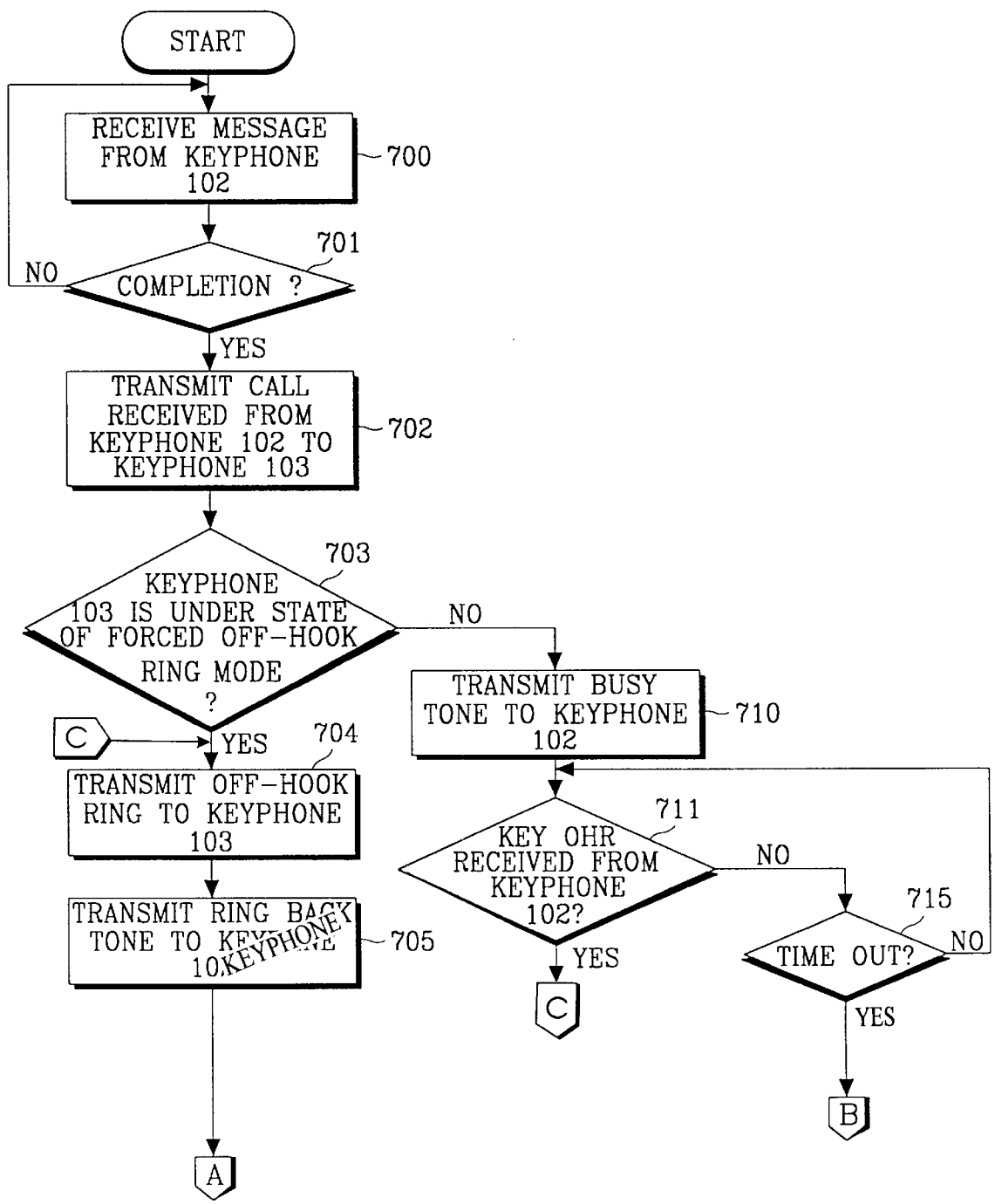
FIGS. 7A–7B is a flow chart showing a method for controlling and processing of an incoming call in a line-busy state according to the principles of the present invention.
Figure 7B:
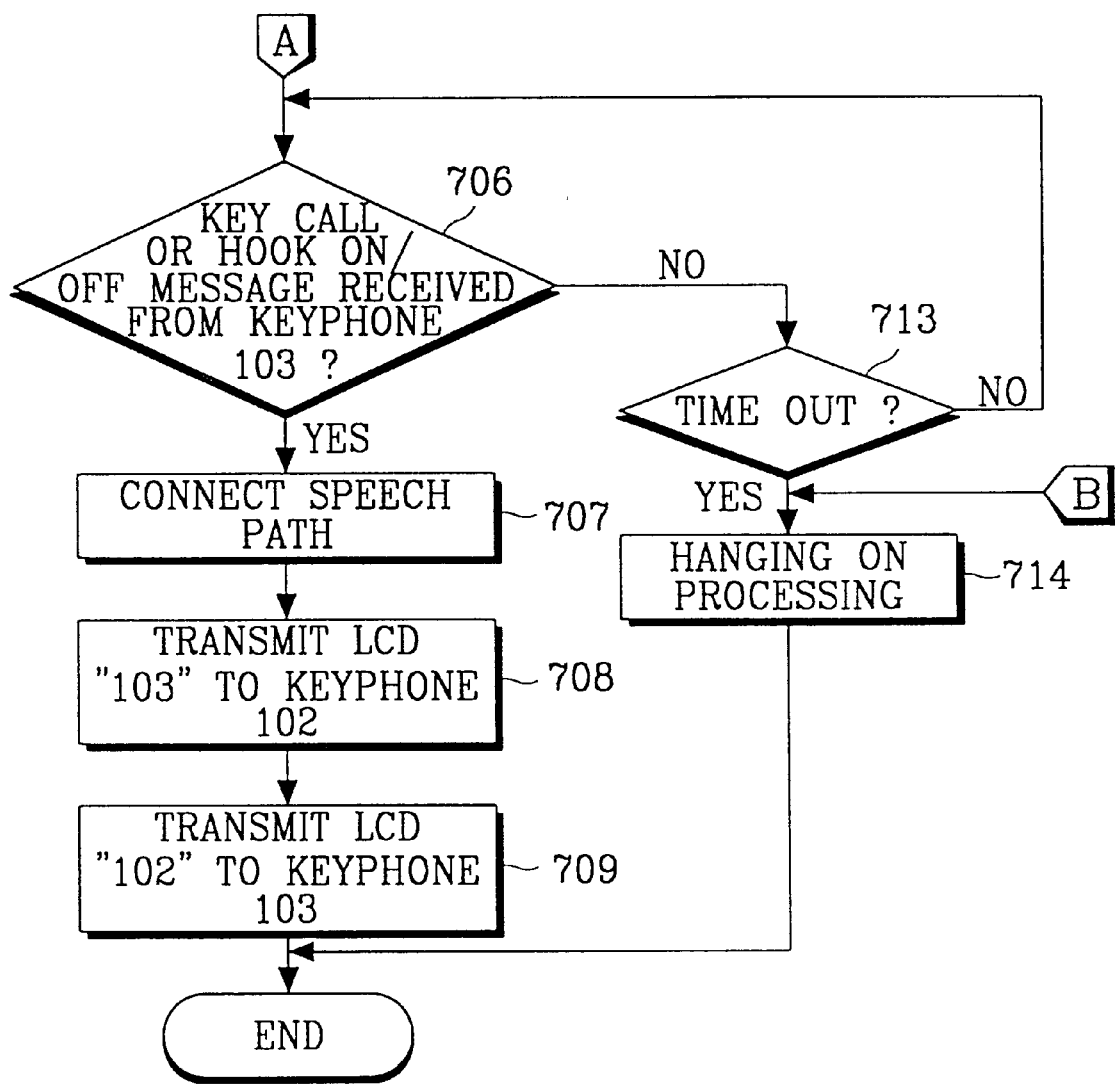

In order to achieve the operations as shown in FIGS. 5 and 6, keyphone main unit 100 sequentially performs the steps shown in FIGS. 7A–7B. FIGS. 7A–7B show a flow chart of a method for controlling and processing an incoming call from keyphone 102 to keyphone 103 in the line-busy state according to the present invention. In step 700 keyphone main unit 100 receives a message, i.e., a sequence of dialed numbers, from keyphone 102 and determines, step 701, whether the input sequence is complete. Upon completion of the dialing sequence, keyphone main unit 100 transmits, step 702, a display signal to keyphone 103 causing keyphone 103 to display a message indicating an incoming call from keyphone 102. Accordingly, the user of keyphone 103 can ascertain whether or not the incoming call is important. In step 703, keyphone main unit 100 determines whether or not keyphone 103 is in a forced off-hook ring mode. When it is determined that keyphone 103 is in a forced off-hook ring mode, keyphone main unit transmits, step 704, an off hook ring to keyphone 103, and then transmits a ring back tone to keyphone 102, step 705. When it is determined in step 703 that keyphone 103 is not in a forced off-hook ring mode, keyphone main unit transmits, step 710, a busy tone to keyphone 102. In step 711, main keyphone unit 100 checks for an input of an OHR signal from keyphone 102 within a predetermined time interval, step 715. If no OHR signal is detected within the predetermined time interval, keyphone main unit 100 performs step 714. If keyphone main unit 100 detects an OHR signal within the predetermined time interval, keyphone main unit 100 transmits, step 704, the off hook ring signal to keyphone 103, and then transmits the ring back tone to keyphone 102, step 705. As noted with respect to FIGS. 5 and 6, keyphone main unit 100 also transmits a camp-on-busy signal "CAMP ON TO 103" to keyphone 102 in step 705.

Keyphone main unit 100 performs step 706 following either of step 705. In step 706, keyphone main unit 100 checks for a signal from keyphone 103 indicating the on/off activation of the hook switch or the pushing of the CALL button within a predetermined time period, step 713. If a signal from keyphone 103 indicating the on/off activation of the hook switch or the pushing of the CALL button is not detected within the predetermined time period, step 713, keyphone main unit 100 performs step 714. If a signal from keyphone 103 indicating the on/off activation of the hook switch or the pushing of the CALL button is detected within the predetermined time period, keyphone main unit 100 connects a speech path between keyphones 102 and 103, step 707, transmits, step 708, a display signal to keyphone 102 causing keyphone 102 to display the number "103" of keyphone 103, and transmits, step 709, a display signal to keyphone 103 causing keyphone to display the number "102" of keyphone 102.

Step 714 is a hanging on process wherein keyphone main unit 100 transmits a disconnect signal to keyphone 102 so that keyphone 102 receives a dial tone signaling the user to hang up the keyphone or attempt another call.

As apparent from the foregoing, the user can check which call is important between the current call and the incoming call according to the method of the present invention, so that it seems to improve the service for answering the incoming call in the line-busy state.

While there have been illustrated and described what are considered to be preferred embodiments of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for controlling and processing an incoming call of a line-busy private exchange system, having a private exchange main unit connected to an office line and a plurality of keyphones, said method comprising the steps of:

checking whether or not another incoming call for forming a speech path with a line-busy keyphone is generated, when a certain keyphone of said plurality of keyphones is in a line-busy state;

reading a telephone number of said certain keyphone, thereby displaying said read telephone number on a display of said line-busy keyphone, when said another incoming call is generated;

determining whether said line-busy keyphone is in a forced off-hook ring mode;

transmitting an off-hook ring signal to said line-busy keyphone when it is determined that said line-busy keyphone is in said forced off-hook ring mode, said off-hook ring signal causing said line-busy keyphone to perform an off-hook ring;

holding a busy line and forming said speech path for said incoming call, in response to a specific signal received from said line-busy keyphone; and displaying a telephone number of said line-busy telephone on a display of said certain keyphone after forming said speech path.

2. The method according to claim 1, wherein said specific signal is generated by a key operation of a hook on/off.

3. The method according to claim 1, wherein said specific signal is generated by a previously set CALL button.

4. The method according to claim 1, further comprising the steps of:

transmitting a busy tone to said certain keyphone when it is determined that said line-busy keyphone is not in said forced off-hook ring mode;

checking, within a first predetermined time period, for an input signal from said certain keyphone, said input signal being indicative of an off-hook ring button on said certain keyphone being pushed;

transmitting said off-hook ring signal to said line-busy keyphone when it is determined that said off-hook ring button on said certain keyphone was pushed within said first predetermined time period, said off-hook ring signal causing said line-busy keyphone to perform an off-hook ring;

transmitting a ring back tone to said certain keyphone;

checking, within a second predetermined time period, for an input signal said specific signal; and stopping said off-hook ring of said line-busy keyphone and connecting said speech path between said certain keyphone and said line-busy keyphone when said specific signal from said line-busy keyphone is detected.

5. The method according to claim 4, wherein said specific signal is generated by a key operation of a hook on/off.

6. The method according to claim 4, wherein said specific signal is generated by a previously set CALL button.

7. A method for controlling and processing a call from one keyphone to a busy keyphone utilizing a keyphone main unit connected to an office line and a plurality of keyphones in a keyphone system, said method comprising the steps of:

receiving an input sequence of dialed numbers from said one keyphone;

determining when said input sequence is complete;

transmitting a first display signal to said busy keyphone to cause said busy keyphone to display a message indicating an incoming call from said one keyphone;

determining whether said busy keyphone is in a forced off-hook ring mode;

transmitting a busy tone to said one keyphone when it is determined that said busy keyphone is not in said forced off-hook ring mode;

checking, within a first predetermined time period, for an input signal from said one keyphone, said input signal being indicative of an off-hook ring button on said one keyphone being pushed;

transmitting an off-hook ring signal to said busy keyphone when it is determined that said busy keyphone is in said forced off-hook ring mode or when it is determined that said off-hook ring button on said one keyphone was pushed within said first predetermined time period, said off-hook ring signal causing said busy keyphone to perform an off-hook ring;

transmitting a ring back tone to said one keyphone;

checking within a second predetermined time period, for an input signal from a CALL button on said busy keyphone; and stopping said off-hook ring of said busy keyphone and connecting a speech path between said one keyphone and said busy keyphone when said input signal from said CALL button on said busy keyphone is detected.

8. The method as set forth in claim 7, further comprising the steps of:

transmitting a second display signal to said one keyphone to cause said one keyphone to display a message indicative of a number of said busy keyphone after connecting said speech path between said one keyphone and said busy keyphone; and simultaneously transmitting a third display signal to said busy keyphone to cause said busy keyphone to display a message indicative of a number of said one keyphone.

9. The method as set forth in claim 7, wherein said step of transmitting said ring back tone to said one keyphone further comprises a step of transmitting a camp-on-busy signal to said one keyphone.

10. A method for controlling and processing a call from one keyphone to a busy keyphone utilizing a keyphone main unit connected to an office line and a plurality of keyphones in a keyphone system, said busy keyphone being connected to a third keyphone, said method comprising the steps of:

receiving an input sequence of dialed numbers from said one keyphone;

determining when said input sequence is complete;

transmitting a first display signal to said busy keyphone to cause said busy keyphone to display a message indicating an incoming call from said one keyphone;

determining whether said busy keyphone is in a forced off-hook ring mode;

transmitting a busy tone to said one keyphone when it is determined that said busy keyphone is not in said forced off-hook ring mode;

checking, within a first predetermined time period, for an input signal from said one keyphone, said input signal being indicative of an off-hook ring button on said one keyphone being pushed;

transmitting an off-hook ring signal to said busy keyphone when it is determined that said busy keyphone is in said forced off-hook ring mode or when it is determined that said off-hook ring button on said one keyphone was pushed within said first predetermined time period, said off-hook ring signal causing said busy keyphone to perform an off-hook ring;

transmitting a ring back tone to said one keyphone;

checking, within a second predetermined time period, for an input signal indicative of an on/off activation of a switch hook on said busy keyphone; and stopping said off-hook ring of said busy keyphone and connecting a speech path between said one keyphone and said busy keyphone when on/off activation of said switch hook on said busy keyphone is detected.

11. The method as set forth in claim 10, further comprising the steps of:

transmitting a second display signal to said one keyphone to cause said one keyphone to display a message indicative of a number of said busy keyphone after connecting said speech path between said one keyphone and said busy keyphone; and simultaneously transmitting a third display signal to said busy keyphone to cause said busy keyphone to display a message indicative of a number of said one keyphone.

12. The method as set forth in claim 10, wherein said step of transmitting said ring back tone to said one keyphone further comprises a step of transmitting a camp-on-busy signal to said one keyphone.

13. The method as set forth in claim 10, wherein said step of connecting a speech path between said one keyphone and said busy keyphone further comprises placing a call from said third keyphone on hold.

* * * * *